United States Patent
Rubin-Smith et al.

(10) Patent No.: US 11,611,529 B1
(45) Date of Patent: Mar. 21, 2023

(54) NETWORK ADDRESS ALLOCATION MANAGEMENT USING PREFIX ALLOCATION TREES WITH ASYNCHRONOUS WORKFLOWS

(71) Applicant: Amazon Technologies, Inc., Seattle, WA (US)

(72) Inventors: Eric Andrew Rubin-Smith, Fairfax, VA (US); Anderson Osagie, Washington, DC (US); Neha Mohan Tilak, Bellevue, WA (US); Masood Karimi, Alexandria, VA (US); Jonathan Paul Kramer, Arlington, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/491,418

(22) Filed: Sep. 30, 2021

(51) Int. Cl.
  *H04W 8/26* (2009.01)
  *H04L 69/40* (2022.01)
  *H04L 29/12* (2006.01)
  *G06F 11/00* (2006.01)
  *H04L 29/08* (2006.01)
  *H04L 61/5007* (2022.01)
  *H04L 101/659* (2022.01)

(52) U.S. Cl.
  CPC .... *H04L 61/5007* (2022.05); *H04L 2101/659* (2022.05)

(58) Field of Classification Search
  CPC .................................................. H04L 51/5007
  See application file for complete search history.

(56) References Cited

U.S. PATENT DOCUMENTS

| | | | | |
|---|---|---|---|---|
| 9,608,930 | B1* | 3/2017 | Brandwine | H04L 47/70 |
| 9,779,015 | B1* | 10/2017 | Oikarinen | G06F 12/02 |
| 10,230,639 | B1* | 3/2019 | Patil | H04L 45/48 |
| 10,693,715 | B1* | 6/2020 | Strauss | H04L 61/255 |
| 2016/0248732 | A1* | 8/2016 | Kolesnik | H04L 61/5061 |

* cited by examiner

*Primary Examiner* — Christopher B Robinson
(74) *Attorney, Agent, or Firm* — Thomas Horstemeyer, LLP

(57) ABSTRACT

Disclosed are various embodiments for managing network address allocations using prefix allocation trees. In one embodiment, a request is received to allocate a particular network address block. The request specifies one or more attributes and at least one of a prefix or a size for the particular network address block. A prefix allocation tree is updated to indicate that the particular network address block corresponding to the prefix is allocated instead of free and to associate the attribute(s) with the particular network address block. An identification of an allocation of the network address block is returned in response to the request to allocate the particular network address block. An attribute index of the prefix allocation tree is updated asynchronously to index the attribute(s) in association with the particular network address block.

18 Claims, 9 Drawing Sheets

NETWORK ADDRESS ALLOCATION MANAGEMENT USING PREFIX ALLOCATION TREES WITH ASYNCHRONOUS WORKFLOWS

BACKGROUND

Network addresses for the Internet are specified in respective addressing schemes for Internet Protocol version 4 (IPv4) and Internet Protocol version 6 (IPv6). IPv4 addresses are 32 bits in length and are usually visually represented by dotted quad notation, with four octets, each ranging from 0 to 255 and separated by periods. There are roughly $2^{32}$ or 4,294,967,296 addresses, less reserved and/or system address ranges. The use of Classless Inter-Domain Routing (CIDR) allowed for allocation of addresses using variable length subnet masks and accompanying arbitrary length network prefixes. For example, a network "192.168.1.0/24" indicates a network prefix 24 bits in length using CIDR notation, with the equivalent subnet mask of "255.255.255.0" being implied by the "/24" CIDR notation. While four billion addresses may seem like a large number, every top-level block of IPv4 addresses has already been allocated. Because of IPv4 address exhaustion, the Internet is transitioning to the use of IPv6, which uses 128-bit addresses and $2^{128}$ possible addresses. IPv6 addresses are represented as eight groupings of four hexadecimal digits, each ranging from 0000 to ffff, and separated by colons.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
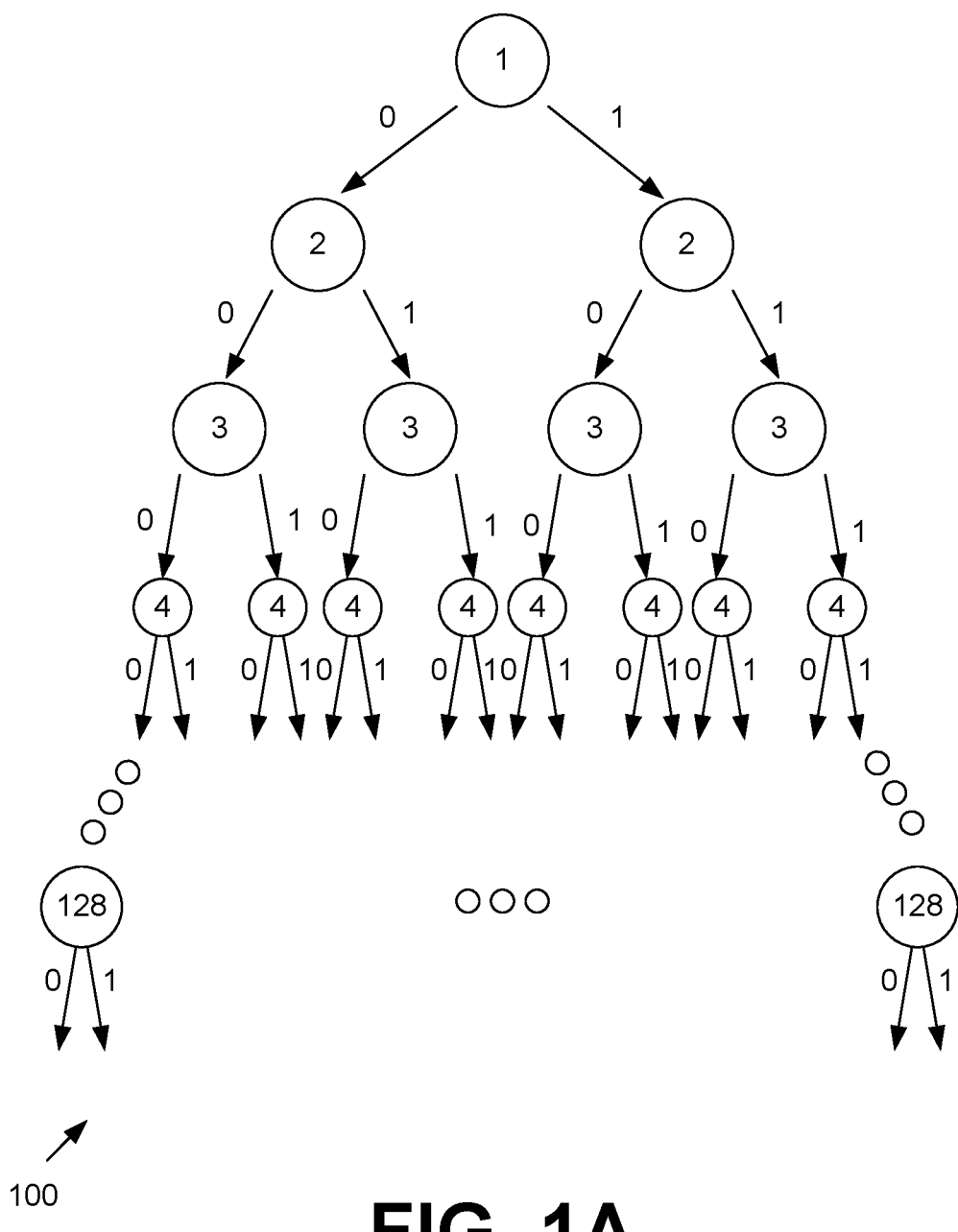
FIGS. 1A-1C are drawings of example prefix allocation trees according to various embodiments of the present disclosure.

The present disclosure relates to the use of prefix allocation trees for managing network address allocations, with the prefix allocation trees being maintained using one or more asynchronous workflows. The network address allocations in the prefix allocation trees may be associated with arbitrary user attributes. Organizations that manage networking infrastructure may need to keep track of network address allocations in order to know what address ranges are already allocated, or conversely, are unallocated and available for allocation. In various scenarios, a customer may be seeking a new network address allocation with at least a certain number of network addresses to configure a subnetwork in a cloud provider network, where the addresses are allocated from a pool of available addresses from the cloud provider or from a pool of addresses that the customer already controls. Using CIDR notation, the "/X" number of bits subtracted from the number of bits in the address yields the number of addresses available in a network according to the formula $2^{(32-X)}$ for IPv4 or $2^{(128-X)}$ for IPv6. For example, a request for a "/28" network allocation in IPv4 would be for $2^{(32-28)}$ or 16 contiguous addresses.

It is also important to avoid unnecessary fragmentation of larger network address blocks to preserve them for customers who may require such larger allocations. To illustrate, within a "/30" block of four contiguous addresses in IPv4 are two "/31" blocks of two contiguous addresses each. Allocating a single address from the first "/31" block and a single address from the second "/31" block would make it impossible to allocate an entire "/31" block of two addresses. Thus, an allocation management system should seek to allocate both single addresses (each considered "/32" blocks) within one "/31" block, thus preserving the entire remaining "/31" block for a possible future allocation request of two contiguous addresses.

With IPv4, network address allocation management could be done with a relatively simple table structure in a database. However, such an approach is not practical or scalable for IPv6, particularly in locating free space of a certain size that can be allocated to the customer within the global pool of network addresses. This is a problem because traditional indexes index data but not the absence of data, and the IPv6 address space is effectively infinite. Thus, occupying all the free space with indexable records is not practical. Moreover, traditional data structures are designed for single-threaded machines and do not scale well to multiple machines or concurrent mutations. Also, making a network call to obtain data from a remote database is five orders of magnitude more computationally expensive than dereferencing a pointer, such as in traditional data structures.

Various embodiments of the present disclosure introduce and optimize a prefix allocation tree data structure in order to manage network address allocation. The prefix allocation tree may also be referred to as a trie. A trie is a type of search tree data structure that can be used to store sequences of values, in which each node represents a single string or a prefix, and all the children of a node have a common prefix of the string associated with that parent node. The presently disclosed trie can be distributed across a number of separate computing devices, for example across a number of different servers in a cloud computing environment.

The prefix allocation tree provides the advantages of representing all of the IPv6 space efficiently; providing transactional, linear-time, O(depth) create, read, update, and delete operations; providing transactional, linear-time, O(depth) allocations of arbitrary size; and providing reliable, non-blocking time-bound snapshots. Although the present disclosure focuses on the example of network address allocation, the prefix allocation tree may be used in any other context in which a power-of-two allocator may be desired, which could include applications such as assigning seats in a concert hall or arena, reserving space in an exhibition hall, allocating time slots on a calendar, and so forth.

Turning now to FIG. 1A, shown is a drawing of an example prefix allocation tree 100 configured for a 128-bit network address, such as an IPv6 network address. Each node corresponds to a level in the tree 100 and a bit position in the corresponding network address, while the transition corresponds to the data encoded by the tree 100. A binary alphabet ("0" and "1") are used in this example. At each node, the bit value may be either "0" or "1", using this alphabet. The tree 100 has a depth of 128, corresponding to the 128 bits represented. Traversing the tree 100 using the leftmost transitions yields the value of "0" 128 times, or the address "::", while traversing the tree 100 using the rightmost transitions yields the value of "1" 128 times, or the address "ffff:ffff:ffff:ffff:ffff:ffff:ffff:ffff".

At each node in the tree 100, a pointer can provide data relating to the allocation of the network address space falling under that corresponding node. Such data can include whether the network address space is available within a pool or is owned by a network services provider or a customer, and whether the network address space (or a portion thereof) has been allocated. With 128 levels, the vast majority of nodes would serve no purpose and would add unnecessary round-trip latencies during path traversals.

Figure 1B:
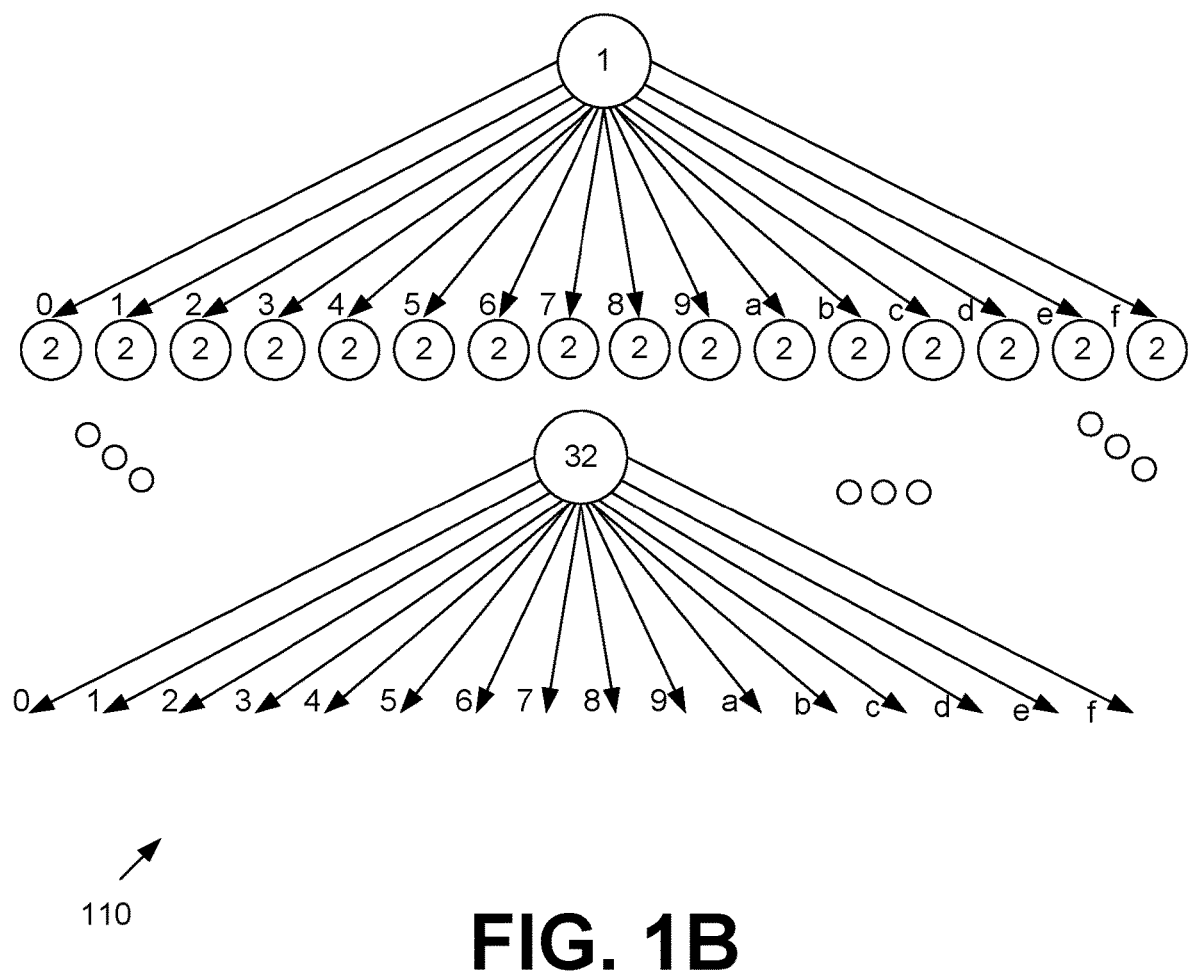

FIG. 1B shows another example of a prefix allocation tree 110, but this time using the hexadecimal alphabet ("0" thorough "f") instead of the binary alphabet. This prefix allocation tree 110 also represents the entire 128-bit address space of IPv6, but now with 32 levels instead of 128. Traversing the tree 110 using the leftmost transitions yields the value of "0" 32 times, or the address "::", while traversing the tree 110 using the rightmost transitions yields the value of "f" 32 times, or the address "ffff:ffff:ffff:ffff:ffff:ffff:ffff:ffff".

While 32 levels may offer latency improvements to the 128-level tree of FIG. 1B, computing service implementation details may weigh toward different trees. As a non-limiting example, a data storage service may have a transaction limit of 25 items per transaction. The ability to alter or mutate a tree using native transactions of the data storage service may significantly simplify the implementation of mutations, particularly involving multi-tenancy, which can result in concurrent requests from different customers. A typical tree, by contrast, is not a concurrent data structure and cannot be used in parallel by multiple users. Thus, in various implementations, a prefix allocation tree has a number of levels less than or equal to a maximum number of items per transaction supported by a data storage service.

In various implementations, each parent node in a prefix allocation tree holds references to its child nodes in order to solve the problem of indexing unoccupied space. However, the number of child references grows exponentially as the tree depth decreases. A data storage service may have a constraint that limits due to data size the number of references that can be stored for a given parent node. Therefore, although shallower trees may be preferable, making the tree shallower causes the amount of data stored for each node to increase. Moreover, as the amount of data stored for each node increases, contention increases. The same number of mutations have to happen on a smaller set of data items, and as those items grow larger, those mutations become more input/output (I/O) intensive and take longer to perform.

Figure 1C:
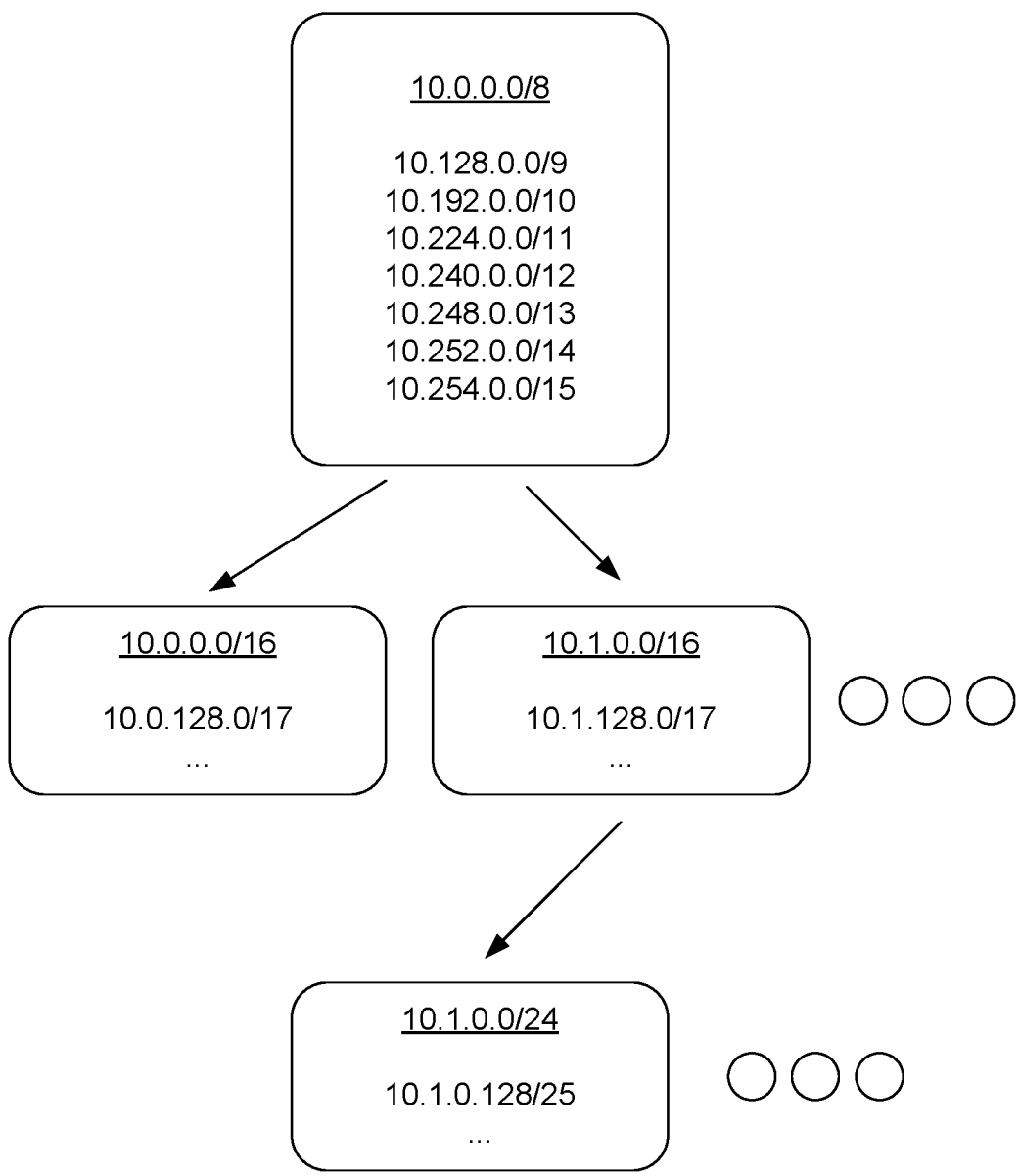

FIG. 1C shows another example of a prefix allocation tree 120 with a top-level address block of "10.0.0.0/8" in CIDR notation. In this example, the nodes of the prefix allocation tree 120 are eight-bit aligned, though other alignments may be chosen in other examples. That is to say, the prefix length is divisible by a value, which is eight in this case. Being eight-bit aligned, the top-level node is a "/8," the next child nodes are "/16," and the grandchild nodes are "/24." Thus, the successive child nodes are a next multiple of the value. In another example, the nodes are four-bit aligned, which would lead to a greater number of nodes, e.g., "/8" followed by "/12," followed by "/16," followed by "/20," and so forth.

Each node encompasses the named address block and all children that are less specific than that named by the child node. For instance, the node for the "10.0.0.0/8" block includes child address blocks within the named block of sizes from "/8" to "/15," while the node for the "10.1.0.0/16" block includes child address blocks within the named block of sizes from "/16" to "/23," and so forth. In special edge cases, the node for a "/24" block may include "/32" child address blocks for IPv4, and the node for a "/120" block may include "/128" child address blocks for IPv6, as these latter address blocks are in fact single addresses.

In order to optimize performance in view of underlying data storage system constraints, invariants may be maintained for the prefix allocation tree 120. For example, when an allocation exists for an address block, all of that address block's space is precisely and completely covered by a combination of suballocations and free block indicators for the allocation.

Non-limiting examples of advantages of the disclosed prefix allocation tree techniques include allowing for suballocations to arbitrary depth; allowing for arbitrary user attributes to be atomically stored and indexed alongside allocations; allowing for consistent snapshots to be taken of an entire prefix allocation tree, potentially in the face of concurrent mutations; allowing for splitting an allocation into several pieces for independent management; scaling and performance improvements; allowing for synchronizing an entire prefix allocation tree to a given baseline of content, while calculating differences between the prefix allocation tree and the baseline; storing user content separately from the structure of the prefix allocation tree; avoiding reliance on global indices maintained by a data storage service; and so forth. In the following discussion, a general description of the system and its components is provided, followed by a discussion of the operation of the same.

Figure 2:
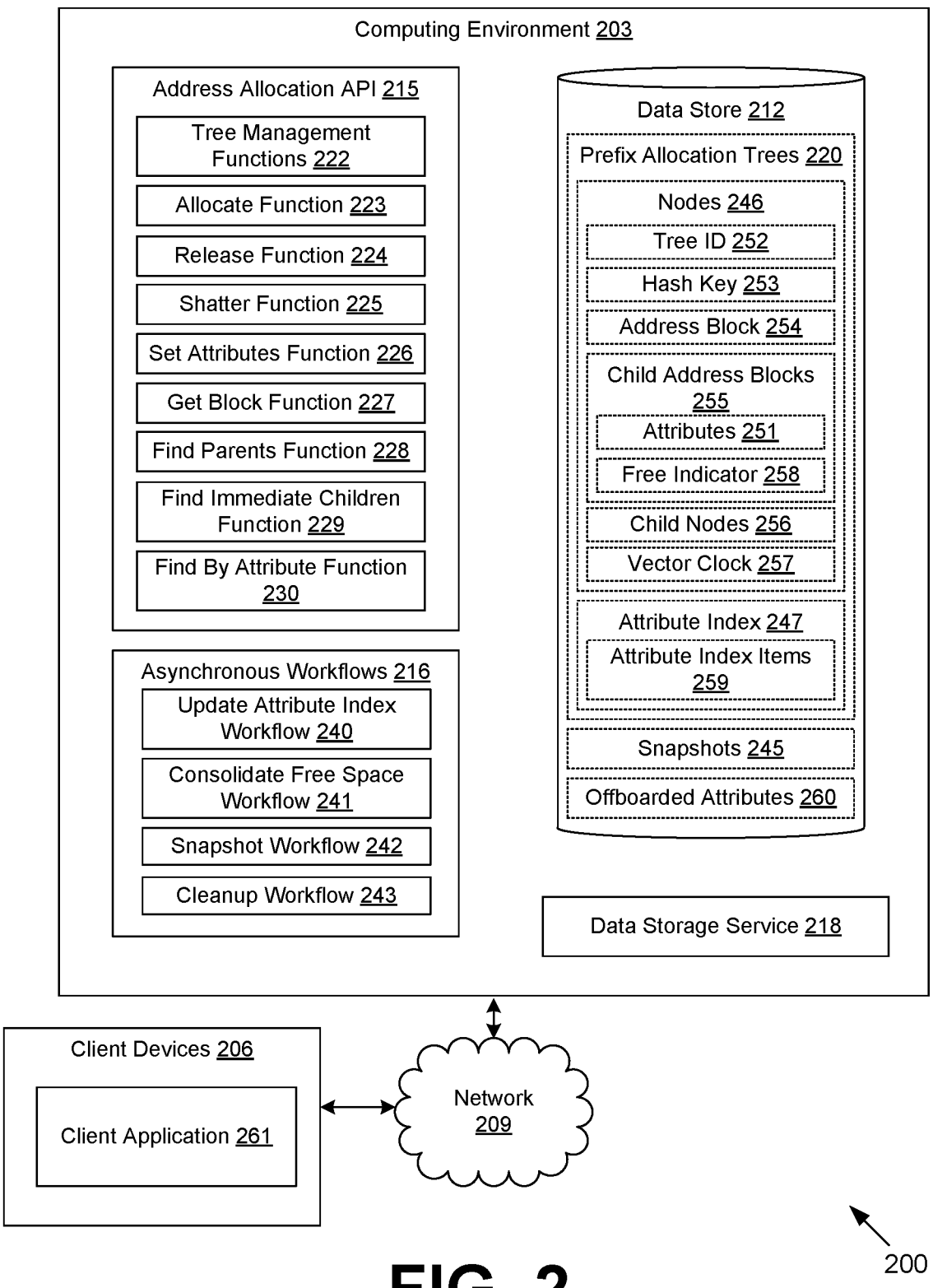
FIG. 2 is a schematic block diagram of a networked environment according to various embodiments of the present disclosure.

With reference to FIG. 2, shown is a networked environment 200 according to various embodiments. The networked environment 200 includes a computing environment 203, and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The networked environment 200 may correspond to a cloud provider network (sometimes referred to simply as a "cloud"), which is a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable loads. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Example regions include U.S. East (located on the east coast of the U.S.), U.S. West (located on the west coast of the U.S.), Europe—London, and Europe—Paris. Each region can include two or more availability zones connected to one another via a private high-speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) to access resources and services of the cloud provider network. Transit Centers (TCs) are the primary backbone locations linking customers to the networked environment 200, and may be co-located at other network provider facilities (e.g., Internet service providers, telecommunications providers). Each region can operate two TCs for redundancy. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

Generally, the traffic and operations of a cloud provider network may broadly be subdivided into two categories: control plane operations carried over a logical control plane and data plane operations carried over a logical data plane. While the data plane represents the movement of user data through the networked environment 200, the control plane represents the movement of control signals through the networked environment 200. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

In some embodiments, the computing environment 203 may correspond to a virtualized private network within a physical network comprising virtual machine instances executed on physical computing hardware, e.g., by way of a hypervisor. The virtual machine instances may be given network connectivity by way of virtualized network components enabled by physical network components, such as routers and switches.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The applications and/or functionality executed in the computing environment 203 include an address allocation application programming interface (API) 215, one or more asynchronous workflows 216, a data storage service 218, and/or other applications, systems, services, engines, and/or other functionality. The address allocation API 215 supports various functionality to manage network address allocations backed by prefix allocation trees 220. Functionality provided by the address allocation API 215 may include tree management functions 222, an allocate function 223, a release function 224, a shatter function 225, a set attributes function 226, a get block function 227, a find parents function 228, a find immediate children function 229, a find by attribute function 230, and/or other functions. These functions will be described in more detail below.

The asynchronous workflows 216 may include one or more workflows that are asynchronously performed with respect to mutations resulting from requests submitted via the address allocation API 215. In other words, the asynchronous workflows 216 are not executed as part of the mutations and are not necessarily executed immediately after or in response to the mutations. The asynchronous workflows 216 may include an update attribute index workflow 240, a consolidate free space workflow 241, a snapshot workflow 242, a cleanup workflow 243, and/or other workflows. These workflows will be described in more detail below.

The data storage service 218 may correspond to a cloud service that provides data storage management on behalf of the data store 212. In one implementation, the data storage service 218 may correspond to a distributed hash table with key/value-based operations, such as "put," "get," "delete," and so on. In another embodiment, the data storage service 218 may correspond to a relational database management system. For efficiency, the data storage service 218 may have a constraint on a maximum quantity of data to be stored as a value associated with a key. The data storage service 218 may also have a constraint on a maximum number of data items that can be mutated in a single transaction. The data storage service 218 may support eventually consistent reads and/or strongly consistent reads.

The data store 212 includes one or more prefix allocation trees 220 to manage a set of network address allocations, one or more consistent snapshots 245 of one or more of the prefix allocation trees 220, and/or other data. Each prefix allocation tree 220 may include one or more nodes 246 and an attribute index 247. It is noted that individual nodes 246 within the prefix allocation tree 220 and the attribute index 247 may be distributed among multiple computing devices by the data storage service 218 in some embodiments.

A prefix allocation tree 220 may be created with a root node 246 or top-level node 246 corresponding to a largest network address block that may then be suballocated as desired. For example, the root node 246 may correspond to a "/8" network, but other sizes can be used. In some scenarios, a prefix allocation tree 220 may have a plurality of top-level nodes 246 corresponding to non-contiguous top-level allocations. In some scenarios, a prefix allocation tree 200 may have a plurality of top-level nodes 246 corresponding to contiguous top-level allocations, if the user wishes to manage the contiguous top-level allocations separately. Each of the nodes 246 may include one or more attributes 251, a tree identifier 252, a hash key 253, an address block 254, one or more child address blocks 255, references to one or more child nodes 256, one or more vector clocks 257, one or more free indicators 258, and/or other data. In one embodiment, the attributes 251 and the free indicators 258 are attached to the individual child address blocks 255, rather than the node 256 as a whole, and the free indicators 258 may be managed as one type of attribute 251. The nodes 246 may correspond to JavaScript object notation (JSON), yet another markup language (YAML), extensible markup language (XML), and/or any other object serialization or format for storing data in the data storage service 218.

The attributes 251 correspond to name-value pairs that can associate arbitrary user data with particular nodes 246. For example, a user may wish to denote a particular address allocation as corresponding to a type of cost center or usage in an organization. In addition to arbitrary user data, the attributes 251 can include administratively defined attributes such as the vector clock 257, the free indicator 258, allocation identifiers, data shard identifiers, tokens, ownership identifiers, parent node identifiers, and/or any other data of the nodes 246. In one implementation, each attribute 251 includes a name string and a value that can be a string, a list of strings, or a map from string to string. Other data types may be used in other implementations.

The tree identifier 252 may correspond to a unique identifier of the prefix allocation tree 220 in which the node 246 is contained. The hash key 253 in one example may be a combination of the address block 254 and the tree identifier 252, though other data may be used in other examples.

The address block 254 may correspond to a block of network addresses in CIDR notation. In various embodiments, the address block 254 is used as a unique identifier for the node 245. In one embodiment, the address block 254 is constrained to be aligned by some number of bits, such as eight, such that the prefix length in bits is evenly divisible by that value. The address block 254 in a node 246 may be completely free, completely allocated, or partially allocated and partially free. If the address block 254 contains a suballocation, the node 246 may include one or more child address blocks 255 corresponding to suballocations or free parts. In one embodiment, the address block 254 may appear within the child address blocks 255 if there are one or more attributes 251 associated with the address block 254. When an address block 254 is shattered, or prepared for suballocation, multiple child address blocks 255 at a next level are created and marked completely free for allocation. It is noted that child address blocks 255 may be further shattered and subdivided for possible allocation. Each of the child address blocks 255 may be associated with attributes 251, including their own child address blocks 255.

To simplify the prefix allocation tree 220, the node 246 encompasses child address blocks 255 having a prefix length greater than or equal to the prefix length of the address block 254 up to one less than a next multiple of the value by which the prefix length of the address block 254 is aligned. That is to say, where the nodes 246 are eight-bit aligned and the prefix length of the address block 254 is eight, the node 246 may include child address blocks 255 of prefix lengths eight through fifteen. A different node 246 would be created for the next subdivision, or prefix length sixteen, and a reference or identifier of that node 246 would be stored in the child nodes 256. For example, with an eight-bit alignment, there may be a maximum of 255 child nodes 256.

The vector clocks 257 are used to track mutations and in generating consistent snapshots 245 of the prefix allocation tree 220. Each of the address block 254 and the child address blocks 255 may have its own vector clock 257, or the vector clock 257 may be specific to the node 246. In one embodiment, the values in the vector clock 257 are initialized upon creation to be a current wall clock time in milliseconds. Each time the respective address block 254 or child address block 255 is mutated (e.g., shattered, allocated, released, attributes changed, etc.), the respective value of the vector clock 257 may be incremented and/or set to a pairwise maximum as compared to corresponding values in a child or parent vector clock 257. In one implementation, a node 246 may track all vector clock 257 values of itself, its immediate parent node 246, and all of its child nodes 256, which may be a maximum of 258 vector clocks 257 to track. As the allocation or releasing of space is propagated up or down, the vector clocks 257 are updated with the latest values by applying the pairwise maximum.

The free indicator 258 indicates whether a child address block 255 is completely free. The child address block 255 is not completely free if it is either completely allocated or contains at least one allocation in combination with free space. The child address blocks 255 may have their own respective free indicators 258 within the node 246. In one implementation, instead of being a Boolean flag value, the free indicator 258 is a reference to an allocation of which the child address block 255 is a completely free part.

To illustrate the usage of the free indicator 258, in one implementation, when a prefix allocation tree 220 is first created in IPv4, it may have one allocation (e.g., the allocation is of "0.0.0.0/0" and the allocation identifier is the address family root sentinel identifier. Hence on creating a prefix allocation tree 220, there may be one free indicator 258, namely that "0.0.0.0/0" is a completely free part of the address family root sentinel identifier. The API for inserting a top-level node 246 may be a suballocation from the address family root sentinel identifier to the top-level sentinel identifier. Hence on inserting "10.0.0.0/8" as a top-level node 246, the address block 254 of "10.0.0.0/8" may be marked with the top-level sentinel allocation identifier, and also "10.0.0.0/8" may be marked as a completely free part of the top-level sentinel allocation ID. At the same time, the shatter set "0.0.0.0/0" minus "10.0.0.0/8" may each be marked as a completely free part of the address family root sentinel identifier.

For example, "11.0.0.0/8", part of the shatter set, is marked as a free part of the address family root sentinel identifier. This means that the address block 254 "11.0.0.0/8" or any child could be a top-level node 246 at some point if an insert top-level API call is invoked on the "11.0.0.0/8" or any child. This mechanism may prevent overlapping top-level nodes from being inserted, even by concurrent calls. Also, two key invariants may be maintained across the entire address family, namely that every network address in the address family is allocated to something and also a free part of something else, and every network address in an allocation is either a free part of the allocation or suballocated. These may be considered transactional guarantees, such that there is no moment when any caller to allocate or release will observe them as being violated, nor will any consistent snapshot contain a violation of these invariants.

In such an implementation, a call to the allocate function 223 may be a suballocation from the top-level sentinel identifier. The process is similar to the above. Suppose one allocates the address block 254 "10.1.2.0/24" out of the top level "10.0.0.0/8", yielding an allocation identifier of "alloc-123." Then, "10.1.2.0/24" may be marked as a completely free part of "alloc-123" in the corresponding free indicator 258 so that "alloc-123" can be suballocated from that address block 254 later if needed. Meanwhile, the shatter set "10.0.0.0/8" minus "10.1.2.0/24" may be marked as a completely free part of the top-level sentinel identifier, so that other parts of the top-level node 246 can be allocated later. A suballocating call to the allocate function 223 may be a suballocation from the given allocation identifier.

The attribute index 247 is an index of nodes 246 by their attributes 251 using attribute index items 259. In one embodiment, the attribute index 247 is distributed among multiple systems using a plurality of shards. The quantity of shards may be dynamic based at least in part on the size of a prefix allocation tree 220. A large prefix allocation tree 220 with a small number of shards will be suboptimal, as would be a small prefix allocation tree 220 with a large number of shards. In one implementation, buckets of shard quantities may be used (e.g., powers of 10), each of which may be tied to a threshold size for a prefix allocation tree 220. For example, when the prefix allocation tree 220 reaches a threshold size, the number of shards may be increased from 10 to 100.

The attribute index items 259 may include a tree identifier 252; a hash key 253 that includes an identifier of the attribute index item 259, the tree identifier 252, an attribute name, an attribute value, and a shard identifier; an address block 254; and a range key. In one implementation, the range key corresponds to the address block 254 formatted in a non-standard way, with the prefix length followed by the network address, with the prefix length and each entry in the dotted quad notation being padded with leading zeros to be three digits. The range key may then be used with the data storage service 218 to scan through the attribute index 247 in lexicographic order of their range keys, which is equivalent to scanning through the attribute index 247 in order of prefix length followed by network address bytes. To locate all address blocks 254 with a given name/value pair, N parallel queries to the attribute index 247 may be made, one per shard, for all items with the hash keys 253 that include the name/value pair.

In various implementations, the attribute index 247 may include one or more secondary indices that are generated to optimize lookups by particular parameters other than the primary key. For example, a delete tree function of the tree management functions 222 may need to locate all nodes 246 in a prefix allocation tree 220, and having a secondary index that is indexed by the tree identifier 252 may optimize this function. The secondary indices may also be sharded.

The snapshots 245 correspond to consistent snapshots 245 of one or more prefix allocation trees 220. As portions of a prefix allocation tree 220 may be mutated while other portions are not yet updated to reflect the mutation, it is important to be able to have a snapshot 245 that is consistent.

In some implementations, at least a portion of content for the attributes 251 may be stored in offboarded attributes 260. For example, the data storage service 218 may have a data item size limit for storage of data items, and the attributes 251 may exceed this data item size limit. In such cases, the data item, or a portion of the data item exceeding the data item size limit may be stored as offboarded attributes 260 by an alternative data storage service 218 that does not have the particular data item size limit. In some cases, the portion of the data item exceeding the data item size limit may be stored as a sequence of component data items by the data storage service 218, such as a linked list of data items. With the offboarded attributes 260, the attributes 251 stored by the data storage service 218 may include a reference to the corresponding offboarded attributes 260. In order to provide transactional safety guarantees, these offboarded attributes 260 may be immutable and read with strongly consistent reads. Furthermore, the offboarded attributes 260 may be constructed and flushed to storage prior to creating any references to the offboarded attributes 260. Thus, in such an implementation, if a child address block 255 has an attribute 251 referencing an offboarded attribute 260, the offboarded attribute 260 exists and has fixed content.

Returning now to the functions implemented by the address allocation API 215, the tree management functions 222 may include functions to create a new prefix allocation tree 220 for an address family (e.g., IPv4 or IPv6), delete a prefix allocation tree 220, create a prefix allocation tree 220 from a snapshot 245, obtain a snapshot 245 for a given prefix allocation tree 220, synchronize a prefix allocation tree 220 to a given snapshot 245 (which may return the differences between the prefix allocation tree 220 and the snapshot 245), and other functions.

Synchronizing a prefix allocation tree 220 to a given snapshot 245 may be implemented as a batch process in a write-efficient way, so that it performs only the write operations that are needed to make a prefix allocation tree 220 have the same content as the snapshot 245. This is in contrast to an approach that would delete and recreate the prefix allocation tree 220 from the snapshot 245. As this is a batch operation, it may be possible for the synchronization function to fail in process (e.g., if power is lost). The vector clocks 257 and the snapshot workflow 242 can be used to detect such a failure. This is because the vector clocks 257 can indicate if a given item was updated but its parent or child was not.

The allocate function 223 is used to allocate address blocks 254 from a prefix allocation tree 220. A special case of the allocate function 223 may be to insert a new top-level address block 254 into the prefix allocation tree 220. For example, the user may specify a tree identifier 252, an address block 254, one or more attributes 251, and an idempotency token to insert the new top-level address block 254. The allocate function 223 may allocate a specifically requested address block 254 or some address block 254 having a particular prefix length that is available that is a suballocation of a top-level address block 254 or a specific suballocation of the top-level address block 254. The return value may be the newly allocated address block 254 and an allocation identifier. The allocation identifier can be used to alter the attributes of the allocation, to release the allocation, or to suballocate from the allocation.

Internally, the allocate function 223 may update a parent address block 254 to remove a free indicator 258, add the allocation, and add free address blocks 254 for portions of the parent address block 254 outside of the desired allocation. Each of these portions are other address blocks 254 and the total number of such portions is equal to the prefix length of the allocated address block 254 minus the prefix length of the parent. The set of address blocks 254 that needs new free indicators 258 is called the shatter set and can be produced by the shatter function 225.

The release function 224 is used to release a prior allocation from the prefix allocation tree 220. The allocation may be identified by the identifier returned by the allocate function 223 and/or the address block 254 of the allocation. Also in some cases, the release function 224 may be used to delete an address block 254 from a prefix allocation tree 220. The user may also specify a tree identifier 252 and an idempotency token. Internally, the release function 224 may verify that there are no suballocations, to delete the allocation state, and change the address block 254 to have a free indicator 258 indicating that the address block 254 is a free part of the parent address block 254.

The shatter function 225 may be used to shatter an existing allocation into parts. The shatter function 225 may take as parameters the tree identifier 252, an address block 254, an allocation identifier, and an idempotency token. The shatter set is the set of address blocks 254 left after subtracting a child address block 254 from a parent address block 254. The size of this set is equal to the child prefix length minus the parent prefix length. As an example, if one subtracts "10.0.0.0/10" from "10.0.0.0/8", then the result is {10.128.0.0/9, 10.64.0.0/10}—two address blocks 254. If one subtracts "10.1.2.3/32" from "10.0.0.0/8," then the result would be 32−8=24 address blocks 254. Listing them out: "10.1.2.2/32", "10.1.2.0/31", "10.1.2.4/30", "10.1.2.8/29", "10.1.2.16/28", "10.1.2.32/27", "10.1.2.64/26", "10.1.2.128/25", "10.1.3.0/24", "10.1.0.0/23", "10.1.4.0/22", "10.1.8.0/21", "10.1.16.0/20", "10.1.32.0/19", "10.1.64.0/18", "10.1.128.0/17", "10.0.0.0/16", "10.2.0.0/15", "10.4.0.0/14", "10.8.0.0/13", "10.16.0.0/12", "10.32.0.0/11", "10.64.0.0/10," and "10.128.0.0/9". The nodes 246 to be updated to capture such an allocation, while updating the free indicators 258, is the set of all nodes 246 that contain any address block 254 in the shatter set, also referred to as a shatter node set. The number of nodes 246 in the shatter node set may be equal to one less than twice the number of nodes 246 in the parent lineage.

Continuing with the above example, if one wants to allocate "10.1.2.3/32" out of "10.0.0.0/8", then the nodes 246 corresponding to the parent lineage may be updated "10.1.2.0/24," "10.1.0.0/16," and "10.0.0.0/8." The shatter node set also contains "10.1.3.0/24" (a sibling of "10.1.2.0/24") and "10.0.0.0/16" (a sibling of "10.1.0.0/16"). This is because after subtracting "10.1.2.3/32" from "10.0.0.0/8", "10.1.3.0/24" and "10.0.0.0/16" are part of the shatter set and therefore need to be marked as free. Hence the shatter node set comprises these five nodes 246: {"10.1.2.0/24", "10.1.3.0/24", "10.1.0.0/16", "10.0.0.0/16", and "10.0.0.0/8"}. In one implementation, the shatter function 225 will split the allocation into the shatter set, not the shatter node set.

The set attributes function 226 may set attributes for a given allocation identifier. The attributes may be set conditionally based upon a map of conditions that are atomically checked prior to setting the attribute values. Parameters may include a tree identifier 252, an allocation identifier, an address block 254, and the attributes 251 to be set. If an attribute exceeds a data size limit of the data storage service 218, the set attributes function 226 may store the attribute as an offboarded attribute 260.

The get block function 227 returns the attributes 251 of a given address block 254 from a prefix allocation tree 220 identified by a tree identifier 252. In some cases, the attributes 251 may be fetched from the offboarded attributes 260. The attributes 251 are returned from a snapshot 245. The find parents function 228 returns a snapshot 245 of all parents of an address block 254 in a prefix allocation tree 220 identified by a tree identifier 252. The find immediate children function 229 returns a snapshot 245 of all immediate children of a given address block 254. The find by attribute function 230 locates all address blocks 254 having a given value of an attribute 251.

As to the asynchronous workflows 216, the update attribute index workflow 240 is executed asynchronously to update the attribute index 247. This may involve reading the node 246, creating all missing attribute index items 259 for the corresponding node 246, and deleting any obsolete attribute index items 259. In some cases, the update attribute index workflow 240 may index offboarded attributes 260. The consolidate free space workflow 241 is executed asynchronously to consolidate free space within a node 246 and then consolidate free space across all nodes 246 in the prefix allocation tree 220. Consolidating free space in a node 246 involves reading the node 246, performing the calculations, and writing back the node 246. Consolidating free space across nodes 246 may comprise a transaction involving three nodes 246: two adjacent siblings and their parent. The free space from the two siblings can be consolidated into the parent when an allocation is marked as free at the node 246 of each sibling.

The snapshot workflow 242 is executed asynchronously to generate consistent snapshots 245 or to verify whether a snapshot 245 is consistent. In order to generate consistent snapshots 245, the snapshot workflow 242 reads the prefix allocation trees 220 and ensures that the copies of the individual vector clocks 257 are consistent with each other. In one scenario, the snapshot workflow 242 generates an alarm notification if the snapshot 245 is inconsistent and the prefix allocation tree 220 has not changed. In other scenarios, the snapshot 245 may be inconsistent if a mutation is happening. In one embodiment, if the snapshot workflow 242 observes an inconsistency in a copy of the same vector clock 257, the snapshot workflow 242 retries to generate the consistent snapshot 245 until consistency can be observed. The snapshot workflow 242 may also implement structural checks to ensure that each node 246 is referenced as a child of its parent, and that every child referenced in a node 246 is in a snapshot 245. The snapshot workflow 242 may also implement checks to ensure that system invariants are met in the snapshot 245 (e.g., that each allocation identifier is precisely and completely covered by suballocations and free indicators 258). It is noted that a caller may request a consistent snapshot 245 at any time. The snapshot workflow 242 will then take the snapshot, optionally perform consistency checks if the caller wants, and if the consistency checks fail, report that failure to the caller. The caller may accept the inconsistency, alarm about it, retry, or so on.

The cleanup workflow 243 is executed asynchronously to perform clean up tasks in the prefix allocation trees 220 and the attribute index 247, which may include deleting attribute index items 259 that are outdated or not correct references and also deleting offboarded attributes 260 that are no longer referenced or are out of date. To this end, the offboarded attributes 260 may be associated with timestamps and/or version identifiers corresponding to the child address block 254 to which the offboarded attribute 260 pertains. The timestamps and/or version identifiers can be used in determining whether the offboarded attribute is 260 is safe to delete. In some cases, the cleanup workflow 243 may delay purging offboarded attributes 260 for a particular period of time to ensure that updates are not likely happening simultaneously.

The client device 206 is representative of a plurality of client devices that may be coupled to the network 209. The client device 206 may comprise, for example, a processor-based system such as a computer system. Such a computer system may be embodied in the form of a server computer, a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices.

The client device 206 may be configured to execute various applications such as a client application 261 and/or other applications. The client application 261 may be executed in a client device 206, for example, to access network content served up by the computing environment 203 and/or other servers. To this end, the client application 261 may comprise, for example, a service client, a browser, a dedicated application, etc. The client device 206 may be configured to execute applications beyond the client application 261 such as, for example, email applications, social networking applications, word processors, spreadsheets, and/or other applications.

Figure 3A:
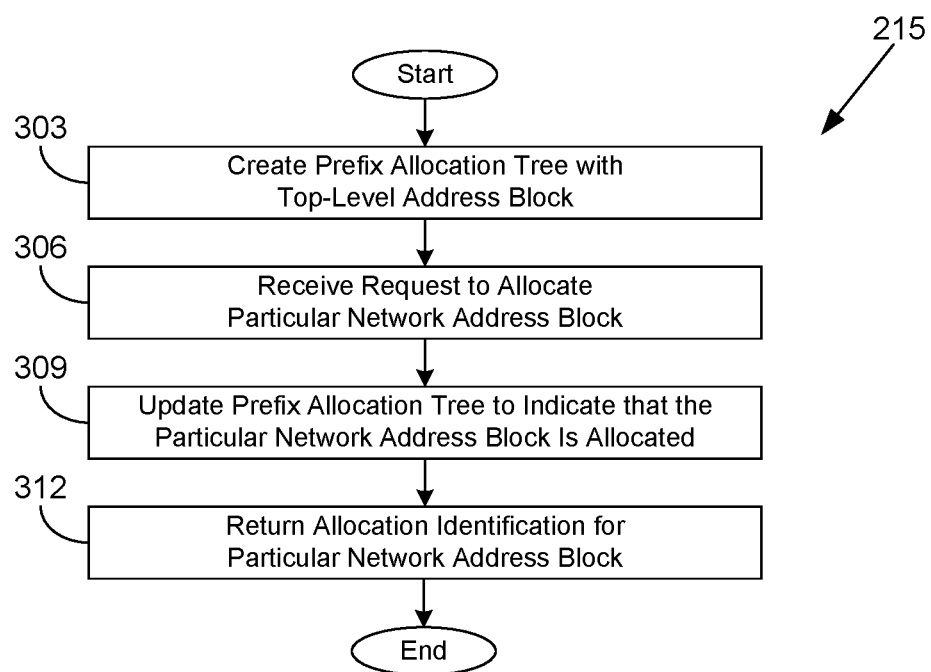
FIGS. 3A and 3C are flowcharts illustrating examples of functionality implemented as portions of an address allocation API executed in a computing environment in the networked environment of FIG. 2 according to various embodiments of the present disclosure.

Referring next to FIG. 3A, shown is a flowchart that provides one example of the operation of a portion of the address allocation API 215 according to various embodiments. It is understood that the flowchart of FIG. 3A provides merely an example of the many different types of functional arrangements that may be employed to implement the operation of the portion of the address allocation API 215 as described herein. As an alternative, the flowchart of FIG. 3A may be viewed as depicting an example of elements of a method implemented in the computing environment 203 (FIG. 2) according to one or more embodiments.

Beginning with box 303, the address allocation API 215 creates a prefix allocation tree 220 (FIG. 2) with a particular top-level address block 254 (FIG. 2). This can involve using one or more tree management functions 222 (FIG. 2) to create the prefix allocation tree 220 and then a function to insert a root node 246 (FIG. 2) or other node 246 with a top-level address block 254 that is initially marked free and which can be subdivided or suballocated.

In box 306, the address allocation API 215 receives a request to allocate a particular network address block 254 via the allocate function 223 (FIG. 2). The request may indicate a network prefix in CIDR notation for the particular network address block 254 and/or a prefix length (e.g., size) for the address block 254 to be allocated. The request may also specify one or more attributes 251 (FIG. 2) for the address block 254 to be allocated, which may include arbitrary user-specified attributes 251. In some scenarios, the request to allocate may specify a list of address blocks 254 that should not be used to fulfill the allocation. For example, problems may occur if a customer wishes to connect two networks and the networks have overlapping address blocks 254. If two devices in a TCP/IP network have the same IP address, then TCP/IP generally does not function correctly, and similar problems arise if two networks in a TCP/IP internetwork have the overlapping address blocks.

In box 309, the address allocation API 215 via the allocate function 223 updates the prefix allocation tree 220 to indicate that the particular network address block 254 corresponding to the prefix is allocated instead of free and to associate the attributes 251 with the particular network address block 254. Updating the prefix allocation tree 220 may include updating the free indicator 258 (FIG. 2) to indicate that the address block 254 is not completely free. If the requested allocation is smaller in size or differs from the top-level address block 254, the allocate function 223 may request via the shatter function 225 (FIG. 2) to shatter the address block 254 in order to make a suballocation and shatter the address block 254 into a plurality of child address blocks 255 (FIG. 2). The shatter request may indicate directly or indirectly a quantity of the child address blocks 255 into which the particular network address block 254 is to be shattered. When a child address block 255 is created, a value in the vector clock 257 (FIG. 2) for the node 246 can be initialized. In some cases as described, child nodes 256 (FIG. 2) may be created when a node 246 cannot store additional child address blocks 255 of a smaller size than permissible.

The shatter process can be repeated recursively multiple times until the address block 254 of an appropriate size is generated. In some instances, the shatter process does not need to be invoked, where address blocks 254 of the desired size were previously created through shattering. In scenarios where a specific network address block 254 is not identified in the request, free space including the address block 254 may be found from the attribute index 247 using the find by attribute function 230 (FIG. 2).

When the particular network address block 254 is identified, the free indicator 258 is updated to indicate that it is no longer a completely free part of another address block. Further, other free indicators 258 of parent network address blocks 254 and/or child network address blocks 255 (and potentially child nodes 256) may need to be updated. Each change or mutation will result in incrementing a respective value in the vector clock 257 of the network address block 254 that is changed, and the updated value in the vector clock 257 will be propagated through the prefix allocation tree 220 for the relevant nodes 246 (child nodes 256 and a parent node 246). In various implementations, when a mutation happens to several nodes 246, the nodes' vector clocks' 257 values are each updated following the element-wise-max approach in such a way that a vector clock 257 contains entries for this node's address block 254, its parent address block, and the child address blocks. Stated another way, a given node's address block 254 may not appear in any grandchild node's or grandparent node's vector clock 257, nor that of any sibling or cousin node—a given node's address block 254 may only appear in its parent's and children's vector clocks 257 (as well as its own vector clock 257).

In box 312, the address allocation API 215 returns an allocation identification for the particular network address block 254 that has been allocated. If allocation were to fail, the address allocation API 215 may instead return an exception. Thereafter, the operation of the portion of the address allocation API 215 ends.

Figure 3B:
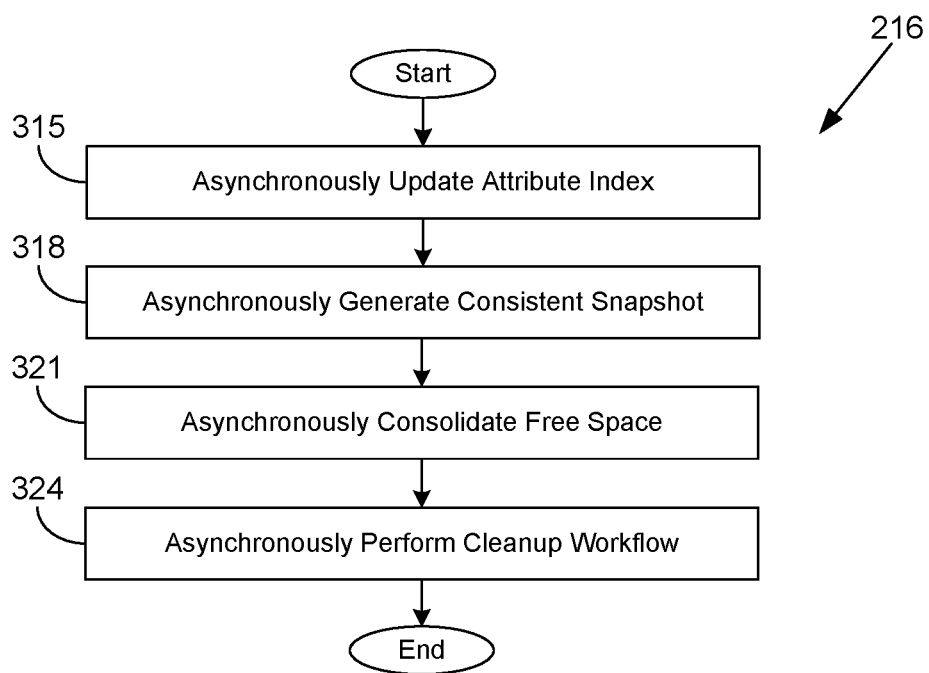
FIG. 3B is a flowchart illustrating one example of functionality implemented as portions of asynchronous workflows executed in a computing environment in the networked environment of FIG. 2 according to various embodiments of the present disclosure.

Continuing to FIG. 3B, shown is a flowchart that provides one example of the operation of a portion of the asynchronous workflows 216 according to various embodiments. It is understood that the flowchart of FIG. 3B provides merely an example of the many different types of functional arrangements that may be employed to implement the operation of the portion of the asynchronous workflows 216 as described herein. As an alternative, the flowchart of FIG. 3B may be viewed as depicting an example of elements of a method implemented in the computing environment 203 (FIG. 2) according to one or more embodiments.

Beginning with box 315, the update attribute index workflow 240 (FIG. 2) is asynchronously executed to update the attribute index 247 (FIG. 2) based on data in the prefix allocation tree 220 (FIG. 2). That is to say, when a prefix allocation tree 220 is mutated, changes to the attributes 251 (FIG. 2) of the nodes 246 (FIG. 2) may not be synchronously propagated to the attribute index 247. Thus, the update attribute index workflow 240 may be executed later, potentially with a lower priority, to update the attribute index 247.

In box 318, the snapshot workflow 242 (FIG. 2) is asynchronously executed to generate a consistent snapshot 245 (FIG. 2) of the prefix allocation trees 220. In so doing, the snapshot workflow 242 may compare copies of a vector clock 257 (FIG. 2) for a particular address block 254 (FIG. 2) to ensure that the copies are in agreement as to the value of the vector clock 257. If the copies are not in agreement, the data is not yet consistent and a snapshot 245 cannot yet be produced. The snapshot workflow 242 may retry until a consistent snapshot 245 can be produced, as indicated by the agreement of values of the copies of the vector clock 257.

In box 321, the consolidate free space workflow 241 (FIG. 2) is asynchronously executed to consolidate free space in a prefix allocation tree 220. For example, if two adjacent address blocks 254 are released in separate transactions, the free indicator 258 (FIG. 2) of the parent address block 254 should be updated to be completely free. The consolidate free space workflow 241 reviews the consistent snapshot 245 to determine address blocks 254 that have become completely free, which may be a recursive process moving up within the prefix allocation tree 220 to successively mark free potentially multiple parent address blocks 254.

In box 324, the cleanup workflow 243 (FIG. 2) may perform various clean up tasks such as deleting attributes 251 in attribute index items 259 (FIG. 2) that are no longer referenced or ensuring that invariants are respected in the prefix allocation tree 220. The operation of the asynchronous workflows 216 may proceed continuously or they may be executed periodically. In some instances, each of the asynchronous workflows 216 may be launched in response to user requests rather than automatically.

Figure 3C:
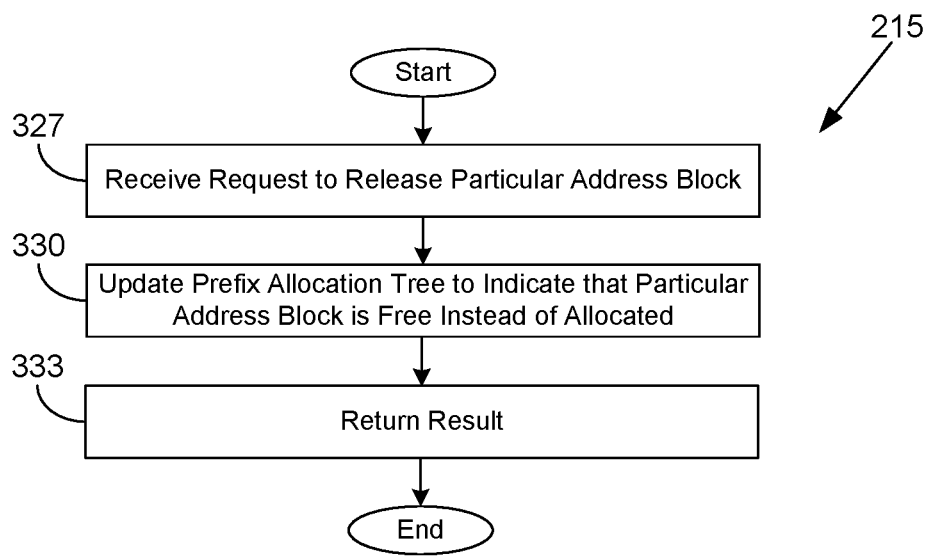

Referring next to FIG. 3C, shown is a flowchart that provides one example of the operation of a portion of the address allocation API 215 according to various embodiments. It is understood that the flowchart of FIG. 3C provides merely an example of the many different types of functional arrangements that may be employed to implement the operation of the portion of the address allocation API 215 as described herein. As an alternative, the flowchart of FIG. 3C may be viewed as depicting an example of elements of a method implemented in the computing environment 203 (FIG. 2) according to one or more embodiments.

Beginning with box 327, the address allocation API 215 receives a request to release a particular address block 254 (FIG. 2) via a release function 224 (FIG. 2). In box 330, the release function 224 updates the prefix allocation tree 220 (FIG. 2) to indicate that the address block 254 is free instead of allocated via updating the free indicator 258. The release function 224 may also update child address blocks 255 (FIG. 2) and child nodes 256 (FIG. 2) of the particular address block 254 to indicate that those address blocks 254 are also free. In box 333, the release function 224 returns the result of releasing the particular address block 254, which may be a Boolean value indicating success or failure. Thereafter, the operation of the portion of the address allocation API 215 ends.

Figure 3D:
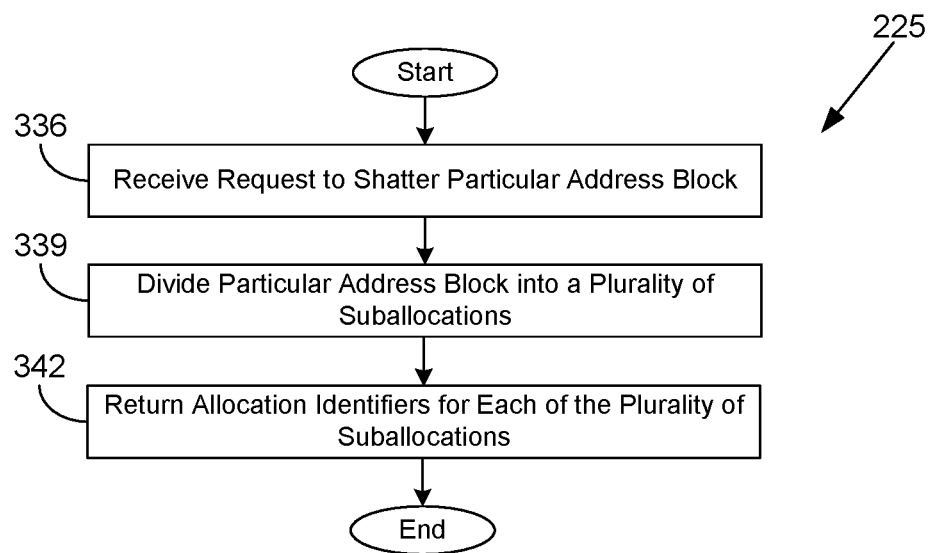
FIG. 3D is a flowchart illustrating one example of functionality implemented as portions of a shatter function executed in a computing environment in the networked environment of FIG. 2 according to various embodiments of the present disclosure.

Continuing to FIG. 3D, shown is a flowchart that provides one example of the operation of a portion of the shatter function 225 according to various embodiments. It is understood that the flowchart of FIG. 3D provides merely an example of the many different types of functional arrangements that may be employed to implement the operation of the portion of the shatter function 225 as described herein. As an alternative, the flowchart of FIG. 3D may be viewed as depicting an example of elements of a method implemented in the computing environment 203 (FIG. 2) according to one or more embodiments.

Beginning with box 336, the shatter function 225 receives a request to shatter an allocation of a particular address block 254 (FIG. 2), identified by an allocation identifier, into parts. In box 339, the shatter function 225 divides the particular address block 254 into a shatter set of suballocations of child address blocks 255 (FIG. 2). For example, if there is an allocation "alloc-123" for "10.0.0.0/8" and the shatter function 225 is invoked with the allocation identifier "alloc-123" and the parameter "10.1.2.3/32" to shatter out a "/32," then the result will be 25 allocations: one for the "/32" requested, and one for each of the 24 address blocks 254 in the shatter set. In box 342, the shatter function 225 may return allocation identifiers for each of the suballocations. Thereafter, the operation of the portion of the shatter function 225 ends.

Figure 4:
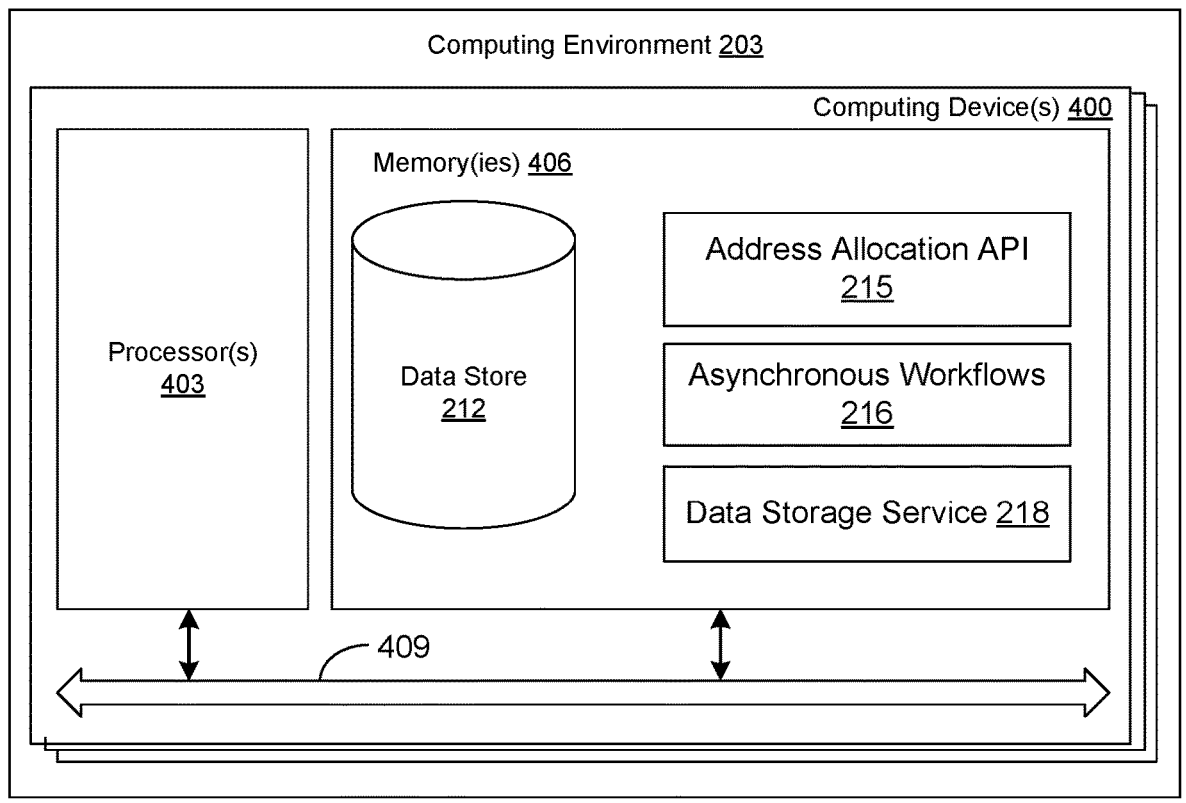
FIG. 4 is a schematic block diagram that provides one example illustration of a computing environment employed in the networked environment of FIG. 2 according to various embodiments of the present disclosure.

With reference to FIG. 4, shown is a schematic block diagram of the computing environment 203 according to an embodiment of the present disclosure. The computing environment 203 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the address allocation API 215, the asynchronous workflows 216, the data storage service 218, and potentially other applications. Also stored in the memory 406 may be a data store 212 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the address allocation API 215, the asynchronous workflows 216, the data storage service 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A-3D show the functionality and operation of an implementation of portions of the address allocation API 215, the asynchronous workflows 216, and the shatter function 225 (FIG. 3D). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3A-3D show a specific order of execution, it is understood that the order of execution may differ from that which is depicted. For example, the order of execution of two or more blocks may be scrambled relative to the order shown. Also, two or more blocks shown in succession in FIGS. 3A-3D may be executed concurrently or with partial concurrence. Further, in some embodiments, one or more of the blocks shown in FIGS. 3A-3D may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the address allocation API 215, the asynchronous workflows 216, and the data storage service 218, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the address allocation API 215, the asynchronous workflows 216, and the data storage service 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices 400 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a cloud provider network comprising at least one computing device;
   a data storage service storing a prefix allocation tree via the at least one computing device, the prefix allocation tree comprising:
   a plurality of nodes individually representing a respective network address block having a first prefix length divisible by a value, at least one of the plurality of nodes further representing a plurality of child network address blocks having respective second prefix lengths greater than or equal to the first prefix length but less than a next multiple of the value above the first prefix length, the at least one of the plurality of nodes includes at least one reference to a child node of the plurality of nodes having a third prefix length being a next multiple of the value above the first prefix length; and
   an attribute index that indexes one or more respective attributes associated with the respective network address blocks, at least one of the one or more respective attributes corresponding to an attribute indicating whether the respective network address block is free to be allocated; and
   an address allocation application programming interface (API) executable in the at least one computing device, wherein when executed the address allocation API causes the at least one computing device to at least:
   receive a request to allocate a particular network address block, the request specifying one or more arbitrary user-specified attributes and at least one of: a prefix for the particular network address block, or a prefix length for the particular network address block;
   update the prefix allocation tree to indicate that the particular network address block is allocated instead of free and to associate the one or more arbitrary user-specified attributes with the particular network address block;
   return an identification of an allocation of the network address block in response to the request to allocate the particular network address block; and
   asynchronously update, with respect to a mutation resulting from the request, an attribute index of the prefix allocation tree.

2. The system of claim 1, wherein updating the prefix allocation tree further comprises at least one of:
   initializing a vector clock value associated with the particular network address block with a current time; or
   incrementing the vector clock value associated with the particular network address block.

3. The system of claim 1, wherein when executed the address allocation API further causes the at least one computing device to at least asynchronously generate a consistent snapshot of the prefix allocation tree based at least in part on verifying that one or more references to respective vector clocks of individual ones of a plurality of network address blocks in the prefix allocation tree are consistent with one another.

4. The system of claim 1, wherein the data storage service corresponds to a distributed hash table, and individual nodes of the plurality of nodes have a corresponding hash key comprising a respective prefix allocation tree identifier and the respective network address block.

5. The system of claim 1, wherein individual attributes of the one or more respective attributes comprise a name and value pair.

6. The system of claim 1, at least one of the one or more respective attributes is stored as an offboarded attribute.

7. The system of claim 1, wherein when executed the address allocation API further causes the at least one computing device to at least asynchronously update, with respect to implementing a mutation as part of the request, the prefix allocation tree to mark a parent network address block as free in response to determining that a plurality of contiguous child network address blocks of the parent network address block are free, wherein the parent network address block is marked as a free part of another network address block.

8. A computer-implemented method, comprising:
   receiving a request to allocate a particular network address block, the request specifying one or more attributes and at least one of: a prefix for the particular network address block or a size of the particular network address block;
   updating a prefix allocation tree to indicate that the particular network address block corresponding to the prefix or the size is allocated instead of free and to associate the one or more attributes with the particular network address block;
   returning an identification of an allocation of the particular network address block in response to the request;
   asynchronously updating, with respect to a mutation implemented as part of the request, an attribute index of the prefix allocation tree to index the one or more attributes in association with the particular network address block;
   receiving a release request to release the particular network address block; and
   updating the attribute index of the prefix allocation tree to indicate that the particular network address block is free instead of allocated in response to the release request.

9. The computer-implemented method of claim 8, wherein the prefix allocation tree comprises a plurality of nodes individually representing a respective network address block having a first prefix length divisible by a value, at least one of the plurality of nodes further representing a plurality of child network address blocks having respective second prefix lengths greater than or equal to the first prefix length but less than a next multiple of the value above the first prefix length.

10. The computer-implemented method of claim 9, wherein the at least one of the plurality of nodes includes at least one reference to a child node of the plurality of nodes.

11. The computer-implemented method of claim 8, wherein respective attributes indicating whether individual network address blocks are allocated or free are indexed by the attribute index, and the method further comprising determining whether another network address block of a particular size is available based at least in part on querying the attribute index.

12. The computer-implemented method of claim 8, wherein updating the prefix allocation tree further comprises at least one of:
 initializing a first vector clock value associated with the particular network address block with a current time; or
 incrementing the first vector clock value associated with the particular network address block.

13. The computer-implemented method of claim 12, wherein updating the prefix allocation tree further comprises:
 setting respective vector clock values associated with one or more child network address blocks of the particular network address block in the prefix allocation tree to be a pairwise maximum compared to the first vector clock value; and
 setting a second vector clock value associated with a parent network address block of the particular network address block in the prefix allocation tree to be a pairwise maximum compared to the first vector clock value.

14. The computer-implemented method of claim 12, further comprising asynchronously, with respect to a mutation caused by the request, generating a consistent snapshot of the prefix allocation tree based at least in part on verifying that one or more references to respective vector clocks of individual ones of a plurality of network address blocks in the prefix allocation tree are consistent with one another.

15. The computer-implemented method of claim 8, further comprising:
 asynchronously updating, with respect to a mutation caused by the request, the prefix allocation tree to mark a parent network address block as free in response to determining that a plurality of contiguous child network address blocks of the parent network address block are free; and
 removing respective free indicators from the plurality of contiguous child network address blocks.

16. The computer-implemented method of claim 8, further comprising:
 receiving a shatter request to shatter the particular network address block into a plurality of child network address blocks, wherein the shatter request indicates directly or indirectly a quantity of the plurality of child network address blocks into which the particular network address block is to be shattered;
 updating the prefix allocation tree in response to the shatter request; and
 returning respective allocation identifications of one or more of the plurality of child network address blocks in response to the shatter request.

17. The computer-implemented method of claim 8, further comprising:
 receiving a request to suballocate a particular child network address block from the particular network address block, the request to suballocate specifying one or more second attributes, an identification of the allocation of the particular network address block, and at least one of: a second prefix for the particular child network address block or a size of the particular child network address block;
 updating the prefix allocation tree to indicate that the particular child network address block corresponding to the second prefix or the second size is allocated instead of free and to associate the one or more second attributes with the particular child network address block; and
 returning an allocation identification of the particular child network address block.

18. A prefix allocation tree for managing network address allocations, comprising:
 a plurality of nodes individually representing a respective network address block having a first prefix length divisible by a value, at least one of the plurality of nodes further representing a plurality of child network address blocks having respective second prefix lengths greater than or equal to the first prefix length but less than a next multiple of the value above the first prefix length, the at least one of the plurality of nodes includes at least one reference to a child node of the plurality of nodes having a third prefix length being a next multiple of the value above the first prefix length, wherein individual nodes of the plurality of nodes include one or more respective attributes associated with the respective network address block, and the prefix allocation tree further comprises an attribute index of the one or more respective attributes that is updated asynchronously with respect to requests to mutate the prefix allocation tree and wherein the one or more respective attributes include an attribute indicating whether the respective network address block is free to be allocated.

* * * * *